United States Patent [19]

Katakabe

[11] Patent Number: 4,748,463

[45] Date of Patent: May 31, 1988

[54] PRINTING APPARATUS

[75] Inventor: Noboru Katakabe, Uji, Japan

[73] Assignee: Matsushita Electric Industrial Co., Ltd., Osaka, Japan

[21] Appl. No.: 905,076

[22] Filed: Sep. 9, 1986

[30] Foreign Application Priority Data

Sep. 10, 1985 [JP] Japan ............................... 60-199713
Sep. 10, 1985 [JP] Japan ............................... 60-199722

[51] Int. Cl.$^4$ .............................................. G01D 15/00

[52] U.S. Cl. .............................. 346/153.1; 346/160.1; 346/106

[58] Field of Search ................ 346/153.1, 160, 76 PH, 346/76 L, 160.1, 106; 355/12, 78, 104; 400/119; 101/DIG. 13; 358/300

[56] References Cited

U.S. PATENT DOCUMENTS 4,388,628 6/1983 Moriguchi et al. ............ 346/76 PH

FOREIGN PATENT DOCUMENTS 45-19819 7/1970 Japan ............................... 346/168.1
53-121637 10/1978 Japan ............................... 346/168.1
W54-17036 2/1979 Japan ............................... 346/153.1

*Primary Examiner*—Arthur G. Evans
*Attorney, Agent, or Firm*—Wenderoth, Lind & Ponack

[57] ABSTRACT

A printing apparatus transfers an ink layer corresponding to an image formed on a conductive light reflective layer by electrosensitive recording onto a recording paper. The apparatus is provided with a high voltage applying electrode or a corona charger for applying static electricity to one of the ink layer and the recording paper. Due to the electrostatic force caused by the static electricity, an ink sheet having the ink layer and the recording paper are maintained in tight contact with each other. Thus accurate transfer of images from the ink sheet to the recording paper is realized.

3 Claims, 2 Drawing Sheets

PRINTING APPARATUS

BACKGROUND OF THE INVENTION

1. Field of the Invention

This invention relates to a printing apparatus for printing pictures and characters used in printers, facsimiles and the like.

2. Description of the Prior Art

As one of the printing methods used to obtain printed matter directly from electric signal information representing characters or pictures, a method of combining electrosensitive recording and thermal copying has been proposed as disclosed in Japanese Unexamined Patent Publication No. 54-17036. Hereunder an example of this conventional printing apparatus will be described by referring to FIG. 3.

FIG. 3 shows a schematic construction of the conventional printing apparatus, in which an ink sheet 1 is composed of a transparent support 2, a conductive light reflective layer 3 (for example, an aluminum deposition layer ) provided on one surface of the support 2 and a thermoplastic ink layer 4 (for example, wax containing carbon) provided on the other surface of the support 2. The apparatus comprises a recording electrode 6, a grounded return circuit electrode 7, a recording signal source 8, a light source 9 for transfer, a transparent glass plate 15, a pressure pad 11 for intermittently pressing the ink sheet 1 and a recording paper 5 together, a spring 13 for pressing the pressure pad 11, and rollers 12 for transferring the ink sheet 1.

First, in the electrosensitive recording process, a recording voltage is applied to the ink sheet 1 via the recording electrode 6 so that the conductive light reflective layer 3 is partly removed by a discharge impulse current. The, the ink sheet 1 is overlaid with the recording paper 5 to begin the transfer process. During the transfer process, the pressure pad 11 is actuated to press the recording paper 5 and ink sheet 1 tightly onto the glass plate 5 to keep them in contact with each other, and the light source 9 emits light to melt the ink layer 4 at the part corresponding to the removed part of the conductive light reflective layer 3, whereby the molten ink is transferred to the recording paper 5. The pressure pad 11 is released after each transferring process so that the overlaid ink sheet and recording paper can be moved for the next transferring process.

In this printing apparatus, however, in order to melt the ink layer 4 at the part exactly corresponding to the removed part of the conductive light reflective layer 3 by the discharge impulse current and transfer the molten ink to the recording paper 5, it is necessary to keep the ink sheet 1 and recording paper 5 in tight contact with each other. If this contact is insufficient, uneven transfer occurs, which may impair the printing quality. Accordingly, a large load (at least 400 g/cm$^2$) is required to press the pressure pad 11 onto the glass plate 15, which results in an increase of the size of the apparatus. Furthermore, since it is necessary to apply the pressure intermittently, the movement control mechanism is complicated.

SUMMARY OF THE INVENTION

In consideration of the above-described problems, it is a primary object of this invention to provide a printing apparatus capable of obtaining satisfactory transfer images by sufficiently maintaining the ink sheet and the recording paper in contact with a simple structure.

It is another object of this invention to provide a printing apparatus which does not require a large pressing force, and is small in size and stable in operation, and can operate continuously.

It is a further object of this invention to provide a printing apparatus capable of printing colors satisfactorily.

In order to achieve the above-described objects, a printing apparatus of the invention comprises means for supplying an ink sheet which comprises a support layer provided on one surface with a conductive light reflective layer and on the other surface with an ink layer, means for overlaying a recording paper on the ink sheet to contact the ink layer, electrosensitive recording means for selectively passing an electric discharge current through a part of the conductive light reflective layer to remove a part of the conductive light reflective layer, means for applying static electricity to one of the ink sheet and the recording paper so that the ink sheet and the recording paper are in tight contact with each other when overlaid, and transfer means for producing a light for irradiating the ink sheet from the conductive light reflective layer when the ink sheet is overlaid with the recording paper so that the ink layer is melted at a part corresponding to the removed part of the conductive light reflective layer and transferred to the recording paper.

PRIEF DESCRIPTION OF THE DRAWINGS

DESCRIPTION OF THE PREFERRED EMBODIMENTS

Figure 1:
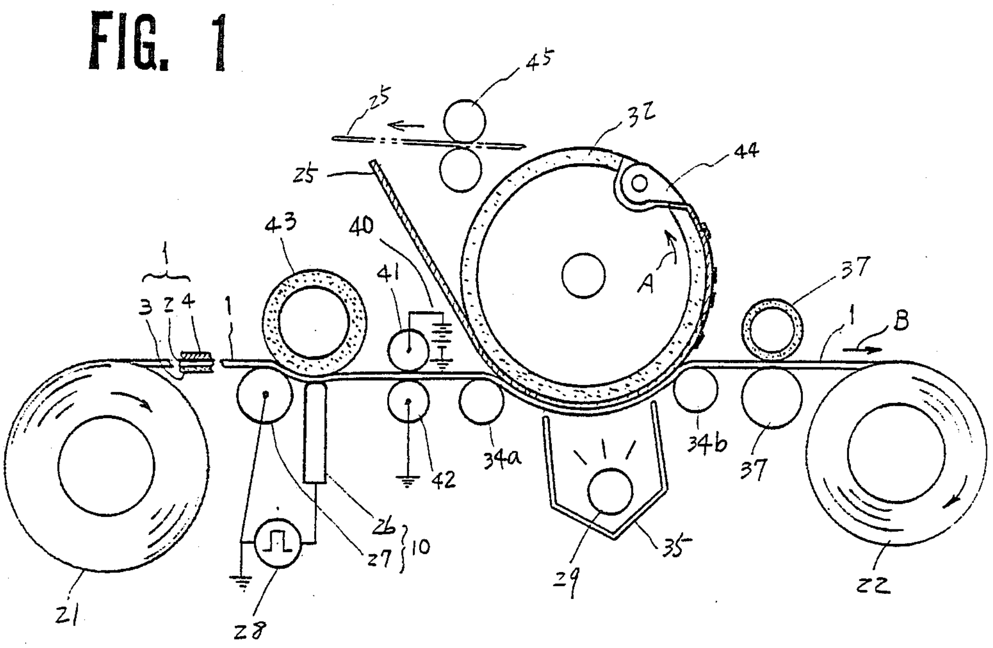
FIG. 1 is a schematic diagram of a printing apparatus according to an embodiment of this invention.

Embodiments of the printing apparatus of this invention will be described below while referring to the drawings.

FIG. 1 shows a first embodiment of the printing apparatus of this invention. In FIG. 1, an ink sheet 1 which is supplied from a supply reel 21 is composed of a conductive light reflective layer 3 (for example, an aluminum deposition layer) provided on one surface of a transparent support layer 2, and a thermoplastic ink layer 4 (for example, wax containing carbon black) provided on the other surface of the support layer 2. A multi-needle recording electrode 26 and a return circuit electrode roller 27 constitute a recording head 10. The ink sheet 1 is pressed against a rubber roller 43 so that all electrode needles of the recording electrode 26 can uniformly contact the conductive light reflective layer 3 of the ink sheet 1. A recording signal source 28 is intended to apply a specified recording signal between the recording electrode 26 and the return circuit electrode roller 27 to pass a current therebetween through the conductive light reflective layer 3. The return circuit electrode roller 27 presses the ink sheet 1 against the rubber roller 43, and it is grounded maintaining conduction through the conductive light reflective layer 3. The conductive light reflective layer 3 is removed at a part where the current has passed.

A high voltage electrode 41 connected with a high voltage source 40 presses the ink sheet 1 against an opposing grounding roller 42. A voltage of 2 to 8 kV produced by the high voltage source 40 is applied to the high voltage electrode 41, so that a static electricity is applied onto the ink layer 4.

A light source 29 (for example, a xenon lamp) produces a light for irradiating the ink sheet 1 from the light reflective layer 3 to melt the ink layer 4 at a part corresponding to the removed part of the light reflective layer 3. The molten ink is transferred to a recording paper 25. Numeral 35 is a light reflector for reflecting the light produced by the light source 29.

A platen roller 32 holds the recording paper 25, and it has a pawl 44 for gripping an end of the recording paper 25. The platen roller 32 is allowed to rotate in the direction of arrow A in synchronism with the movement of the ink sheet 1. A guide roller 34*a* guides the ink sheet 1 to be overlaid with the recording paper 25 held on the plate roller 32. Feed rollers 37 feed the ink sheet 1 which is taken up sequentially on a take-up reel 22.

The printing process of the printing apparatus of this embodiment will be described in more detail hereinafter.

First, when the apparatus is started up, the feed roller 37 begins to rotate, so that the ink sheet 1 is continuously moved in the direction of arrow B. At the same time, the supply roller 21 and take-up roller 22 start to rotate to feed out and take up the ink sheet 1. Simultaneously, recording signals are selectively applied to the recording head 10 from the recording signal source 28. The conductive light reflective layer 3 of the ink sheet 1 is selectively removed by electric discharge currents corresponding to the recording signals representing pictures or characters.

When the ink sheet 1 comes to the position of the high voltage electrode 41, a high voltage produced by the high voltage source 40 is applied to the high voltage electrode 41, so that static electricity is applied to the surface of the ink layer 4 of the ink sheet 1. The ink sheet 1 is then overlaid with the recording paper 25 held on the platen roller 32 at the position of the guide roller 34*a*. Here, the recording paper 25 and ink sheet 1 are firmly pressed to each other due to electrostatic force caused by the static electricity and are sequentially fed above the light source 29. At this time, the light emitted from the light source 29 passes through the removed part of the conductive light reflective layer 3 to heat and melt the ink layer 4 at a part irradiated by the light. The molten ink is deposited firmly on the recording paper 25 because the recording paper 25 is kept in tight contact with the ink sheet 1.

When the ink sheet 1 is sequentially fed out to reach the position of the guide roller 34*b*, the recording paper 25 and ink sheet 1 are peeled off from each other, and at this time the ink layer 4 deposited on the recording paper 25 has been transferred onto the recording paper 25. The light source 29 lights up intermittently every time the ink sheet 1 is sent in by a specified portion to transfer sequentially.

When the pawl 44 comes closer to a discharge roller 45, it is opened to push out the recording paper 25, and peel off the recording paper 25 from the platen roller 32 to be engaged with the discharge roller 45. The discharge roller 45 is always rotating, and the recording paper 25 is fed out of the apparatus by the discharge roller 45 after the transfer process.

In the case of color printing, color ink layers are provided as the ink layer 1 at intervals of a length equal to the circumferential length of the platen roller 32, and the recording paper 25 is wound around the platen roller 32. The platen roller 32 is rotated a number times depending on the number of the color ink layers, with the pawl 44 closed, to transfer different colors on the recording paper 25 during every revolution. When the transfer of the final color is over, the pawl 44 is opened to separate the recording paper 25 from the platen roller 32 to be discharged.

As described above, the strong pressure for tightly contacting the ink sheet and the recording paper is obtained by the static electricity produced by the high voltage electrode 41 and the grounding roller 42. Therefore, no mechanical means are required to press the recording paper onto the ink sheet by a mechanical strong force to keep them in contact. As a result, the structure of the apparatus is simple and stable. Moreover, with the static electricity, the recording paper 25 and ink sheet 1 are pressed to each other sufficiently, so that an ink image of high quality can be obtained.

Furthermore, in the step before overlaying the recording paper 25 on the ink sheet 1, the ink sheet 1 is provided with the static electricity, so that a sufficient adhesion can be always obtained even in the case of color printing in which the platen roller 32 rotates a number times with the recording paper 25 wound on it. And also by this structure, since it is not necessary to separate the recording paper 25 from the platen roller 32 after every rotation, dislocation does not occur among different colors, so that an excellent color printing is realized.

Figure 2:
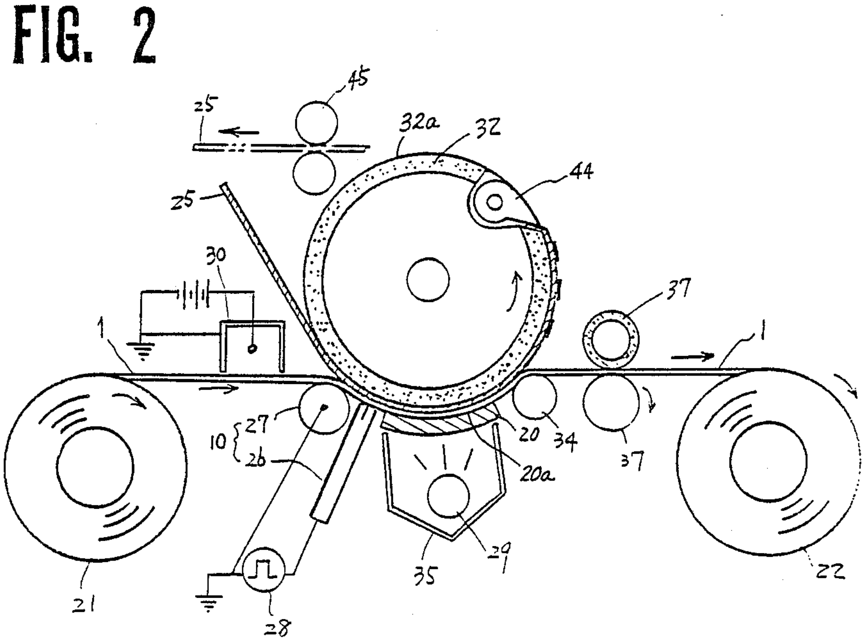
FIG. 2 is a schematic diagram of a printing apparatus according to another embodiment of this invention.
Figure 3:
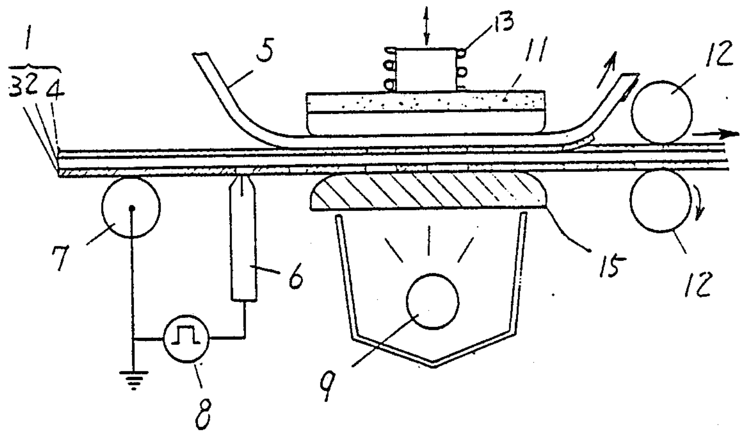
FIG. 3 PRIOR ART
FIG. 3 is a schematic diagram of a conventional printing apparatus.

A second embodiment is shown in FIG. 2. The recording head 10 is provided to press the ink sheet 1 and recording paper 25 against the platen roller 32. A transparent glass plate 20 is disposed so as to oppose to the light source 29. This glass plate 20 continuously presses the overlaid ink sheet 1 and recording paper 25 onto the platen roller 32 with a relatively light force (50 to 100 g/cm$^2$) so as to further strengthen the contact between the ink sheet 1 and recording paper 25. The surface 20*a* of the glass plate 20 facing the outer round surface 32*a* of the platen roller 32 is curved along the outer round surface of the platen roller 32 so that the overlaid ink sheet 1 and recording paper 25 are pressed onto each other in the area of the curved surface of the glass plate 20 between the glass plate 20 and the platen roller 32. A corona charger 30 is located before the recording electrode 26 in order to provided the ink layer of the ink sheet 1 with static electricity before the electrosensitive recording.

In the operation of this embodiment, first, static electricity is applied to the ink sheet 1 by the corona charger 30, and then the recording paper 25 and the ink sheet 1 are overlaid on the platen roller 32. Consequently, the conductive light reflective layer of the ink sheet 1 is partly removed by electric discharge current by the recording head 10. Next, the ink sheet 1 and the recording paper 25 move to the position of the glass plate 20 when the light source 29 lights up to melt the ink layer partly to deposit the ink on the recording paper 25. When the ink sheet 1 and recording paper 25 move further, they are separated from each other at the position of a guide roller 34, when the ink image has been transferred onto the recording paper. This operation is executed continuously and sequentially to finish printing on the entire surface of the recording paper 25. Finally the pawl 44 is opened, and the recording paper 25 is engaged with the discharge roller 45 to be discharged outside. Meanwhile, the glass plate 20 keeps pressing the platen roller 32 during printing operation, and the ink sheet 1 slides on the glass plate 20.

In this embodiment, since static electricity is applied by the corona charger 30 before the electrosensitive recording, the conductive light reflective layer is not removed at the position of applying static electricity, and it serves as a grounding electrode. Therefore, static electricity can be applied uniformly on the entire surface of the ink layer. Besides, since the recording paper 25 and ink sheet 1 are mechanically fitted to each other by means of the glass plate 20, the contact of the ink sheet 1 and the recording paper 25 is enhanced, so that printing of high quality is realized.

In the above-described embodiments, static electricity is applied to the ink layer 4 of the ink sheet 1 before the ink sheet 1 is brought into tight contact with the recording paper 25. But this invention is not limited to such a construction. A sufficient contact is obtained and printing of excellent quality is possible if static electricity is applied to the recording sheet after overlaying the ink sheet 1 and recording paper 25 together. Furthermore, static electricity may be applied to the recording paper instead of the ink sheet.

Note, the ink sheet 1 is composed of three layers, that is, a conductive light reflective layer 3, a support layer 2 and an ink layer 4, in these embodiments. However, exactly the same effect will be obtained by adding a layer which easily exchanges light to heat between the support layer 2 and ink layer 4, or making the support layer 2 of a material which is opaque and generates heat by itself.

What is claimed is:

1. A printing apparatus for transferring ink from an ink sheet including a support layer, a conductive light reflective layer on one surface of the support layer and an ink layer on the other surface of the support layer onto a recording sheet, said apparatus comprising:

a supply means for supplying the ink sheet;

means for moving the ink sheet in a printing direction;

electrosensitive recording means for selectively passing an electric discharge current through a part of the conductive light reflective layer of the ink sheet to remove the part of the conductive light reflective layer from the ink sheet;

a cylindrical drum disposed downstream of the electrosensitive recording means in the printing direction, said cylindrical drum for holding the recording sheet on the cylidrical outer peripheral surface thereof, and means for rotating said drum in synchronism with the movement of the ink sheet;

overlaying means for overlaying the ink sheet on the recording paper with the ink layer contacting the recording paper;

a stationary transparent plate having a curved surface opposing and generally conformed to the outer cylindrical surface of said cylindrical drum, said transparent plate for continuously pressing, along said curved surface thereof, the ink sheet overlaid on the recording paper against the outer cylindrical surface of said cylindrical drum; and transfer means for transmitting light through said transparent plate to irradiate the ink layer through the conductive light reflective layer to melt a part of the ink layer corresponding to the removed part of the conductive light reflective layer onto the recording sheet.

2. A printing apparatus as claimed in claim 1, and further comprising means for applying static electricity to the ink sheet before the ink sheet is overlaid on the recording sheet to cause the ink sheet and the recording sheet to be attracted into contact with one another when overlaid.

3. A printing apparatus as claimed in claim 1, wherein said electrosensitive recording means is disposed between said overlaying means and said transparent plate.

* * * * *